US010778435B1

(12) United States Patent
Wimberley et al.

(10) Patent No.: US 10,778,435 B1
(45) Date of Patent: Sep. 15, 2020

(54) SYSTEMS AND METHODS FOR ENHANCED MOBILE DEVICE AUTHENTICATION

(71) Applicant: JPMorgan Chase Bank, N.A., New York, NY (US)

(72) Inventors: Ken Wimberley, San Rafael, CA (US); Andrew Sloper, Surry (GB); Ta-Wei Chen, Princeton Junction, NJ (US); Gautam Chhawchharia, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 615 days.

(21) Appl. No.: 15/393,836

(22) Filed: Dec. 29, 2016

Related U.S. Application Data

(60) Provisional application No. 62/273,003, filed on Dec. 30, 2015, provisional application No. 62/321,060, filed on Apr. 11, 2016.

(51) Int. Cl.
*H04L 9/32* (2006.01)
*H04L 9/06* (2006.01)
(Continued)

(52) U.S. Cl.
CPC .......... *H04L 9/3228* (2013.01); *H04L 9/0643* (2013.01); *H04L 9/14* (2013.01); *H04L 9/30* (2013.01)

(58) Field of Classification Search
CPC ....... H04L 9/3228; H04L 9/0643; H04L 9/14; H04L 9/30
See application file for complete search history.

(56) References Cited

U.S. PATENT DOCUMENTS 5,764,772 A * 6/1998 Kaufman .............. H04L 9/0894 380/286
6,212,585 B1 * 4/2001 Chrabaszcz ............. H04L 29/06 709/220

(Continued)

OTHER PUBLICATIONS

Vaze ("Vaze," "Digital Signature On-Line, One Time Private Key [OTPK]," Online Certification Process with Strong (2-Factor Authentication), International Journal of Scientific & Engineering Research vol. 3, Issue 3, Mar. 2012, pp. 1-5).*

(Continued)

*Primary Examiner* — Luu T Pham
*Assistant Examiner* — James J Wilcox
(74) *Attorney, Agent, or Firm* — Greenberg Traurig LLP

(57) ABSTRACT

Systems and methods for enhanced mobile device authentication are disclosed. Systems and methods for enhanced mobile authentication are disclosed. In one embodiment, method for electronic device authentication may include (1) a server comprising at least one computer processor communicating a one-time passcode to an electronic device over a first communication channel; (2) the server receiving, from the electronic device over a second communication channel the one-time passcode encrypted with a private key associated with the electronic device; (3) the server decrypting the one-time passcode using a public key; (4) the server validating the one-time passcode; (5) the server generating a device identifier for the electronic device; and (6) the server persisting an association between the device identifier and the electronic device.

12 Claims, 5 Drawing Sheets

Receive OTP (405)
Crypto Key exchange (410)
Encrypt OTP (415)
Derive ASVK (420)
Communicate ASVK and encrypted OTP to server (425)
Decrypt OTP (430)
Valid OTP? (435)
NO
End (440)
YES
Decrypt ASVK (445)
Generate Device ID (450)
Persist binding (455)
User creates password (460)

(51) Int. Cl.
*H04L 9/14* (2006.01)
*H04L 9/30* (2006.01)

(56) References Cited

U.S. PATENT DOCUMENTS 8,458,483 B1 * 6/2013 Bailey .................. H04B 5/0056 713/182
8,533,460 B2 * 9/2013 Hird ........................ G06F 21/34 713/155
8,719,952 B1 * 5/2014 Damm-Goossens ........................ H04L 9/0825 380/285
8,799,655 B1 * 8/2014 Dotan ................. H04L 63/0838 713/168
8,904,482 B1 * 12/2014 Dotan ..................... G06F 21/34 726/2
9,032,212 B1 * 5/2015 Juels ..................... H04L 9/3271 713/176
9,191,386 B1 * 11/2015 Yaron ................. H04L 63/0846
9,432,339 B1 * 8/2016 Bowness ............. H04L 63/0838
9,805,182 B1 * 10/2017 Kayyidavazhiyil ..... G06F 21/36
2006/0083228 A1 * 4/2006 Ong ........................ G06F 21/34 370/389
2007/0112676 A1 * 5/2007 Kontio ............... G06Q 20/3674 705/50
2010/0217982 A1 * 8/2010 Brown .................. H04W 12/06 713/168
2013/0263212 A1 * 10/2013 Faltyn ................... H04W 12/08 726/1
2014/0245377 A1 * 8/2014 Faltyn ................... H04W 12/08 726/1
2014/0245378 A1 * 8/2014 Faltyn ................... H04W 12/08 726/1
2014/0281539 A1 * 9/2014 Faltyn ..................... H04L 63/08 713/168
2015/0073992 A1 * 3/2015 Weiner .............. H04W 12/0608 705/44
2016/0013947 A1 * 1/2016 Jaber ..................... H04L 9/3215 713/156
2016/0086184 A1 * 3/2016 Carpenter .......... G06Q 20/4016 705/44
2016/0142205 A1 * 5/2016 Mohan .................. H04L 9/0869 380/44
2016/0156598 A1 * 6/2016 Alonso Cebrian .......................... H04L 63/0838 713/168

OTHER PUBLICATIONS

Eldefrawy-OTP Based Two Factor Authentication Using Mobile Phones, 2011 Eighth International Conference on Information Technology: New Generations, pp. 327-331 (Year: 2011).*

* cited by examiner

SYSTEMS AND METHODS FOR ENHANCED MOBILE DEVICE AUTHENTICATION

RELATED APPLICATIONS

The present application is related to U.S. Provisional Patent Application Ser. No. 62/273,003, filed Dec. 30, 2015, and U.S. Provisional Patent Application Ser. No. 62/321,060, filed Apr. 11, 2016, the disclosures of each of which is hereby incorporated by reference in its entirety.

BACKGROUND OF THE INVENTION

Banks seek to authenticate customers more effectively and with the best customer possible experience. The mobile device offers huge potential in that it is personal, near ubiquitous, usually with the owner, and increasingly used for banking activity.

SUMMARY OF THE INVENTION

Systems and methods for enhanced mobile authentication are disclosed. In one embodiment, method for electronic device authentication may include (1) a server comprising at least one computer processor communicating a one-time passcode to an electronic device over a first communication channel; (2) the server receiving, from the electronic device over a second communication channel the one-time passcode encrypted with a private key associated with the electronic device; (3) the server decrypting the one-time passcode using a public key; (4) the server validating the one-time passcode; (5) the server generating a device identifier for the electronic device; and (6) the server persisting an association between the device identifier and the electronic device.

In one embodiment, the method may further include the server receiving, from the electronic device over the second communication channel, a password; and the server persisting the password.

In one embodiment, the device identifier may include a universally unique identifier.

In one embodiment, the method may further include the server receiving from the electronic device over the second communication channel, a public key paired with the private key.

In one embodiment, the method may further include the server receiving, from the electronic device over the second communication channel, an application specific verification key; and the server decrypting the application specific verification key. The step of persisting the association between the device identifier and the electronic device further comprises storing an indication that the application specific verification key was valid.

In one embodiment, the application specific verification key may be calculated according to the following equation:

ASVK=HASH(salt+Env+OTP);

where:

"salt" comprises a cryptographic salt;

"Env" comprises at least one environmental parameter;

OTP is the one-time password; and

HASH comprises a hashing algorithm.

In one embodiment, the method may further include the server receiving, from the electronic device over the second communication channel, device fingerprint data for the electronic device.

In one embodiment, the method may further include the server communicating, over the second communication channel, the device identifier to the electronic device.

According to another embodiment, a method for electronic device authentication may include (1) an application executed by an electronic device comprising at least one computer processor receiving, over a first communication channel, a one-time passcode from a server; (2) the application encrypting the one-time passcode with a private key; (3) the application communicating, over a second communication channel, the one-time passcode encrypted with the private key to the server; (4) the application receiving, from the server, a device identifier for the electronic device; and (5) the application persisting the device identifier.

In one embodiment, the method may further include the application generating an application specific verification key; and the application communicating, over the second communication channel, the application specific verification key to the server; wherein the application specific verification key may be calculated according to the following equation:

ASVK=HASH(salt+Env+OTP);

where:

"salt" comprises a cryptographic salt;

"Env" comprises at least one environmental parameter;

OTP is the one-time password; and

HASH comprises a hashing algorithm.

In one embodiment, the device identifier may include a universally unique identifier.

In one embodiment, the method may further include the application generating a public key and private key pair; and the application persisting the private key in one of a secure element of the electronic device or in a secure storage element of one of the application and an operating system executed by the electronic device.

In one embodiment, the method may further include the application communicating, over the second communication channel, device fingerprint data for the electronic device to the server.

A system for electronic device authentication may include an electronic device comprising at least one electronic device computer processor, a memory, and an interface; an authentication server comprising at least one server computer processor; a first communication channel between the electronic device and the server; and a second communication channel between the electronic device and the server. The authentication server may generate a one-time passcode and communicates the one-time passcode to the over the first communication channel. The application may encrypt the one-time passcode with a private key and communicates, over the second communication channel, the one-time passcode encrypted with the private key to the authentication server. The authentication server may decrypt the one-time passcode using a public key, and may validate the one-time passcode. It may also generate a device identifier for the electronic device and persist an association between the device identifier and the electronic device. It may then communicate, over the second communication channel, the device identifier for the electronic device to the application. The application may then persist the device identifier.

In one embodiment, the application may generate an application specific verification key, and communicates the application specific verification key to the authentication server over the second communication channel; wherein the application specific verification key may be calculated according to the following equation:

ASVK=HASH(salt+Env+OTP);

where:

"salt" comprises a cryptographic salt;

"Env" comprises at least one environmental parameter;

OTP is the one-time password; and

HASH comprises a hashing algorithm.

In one embodiment, the authentication server may decrypt the application specific verification key and stores an indication that the application specific verification key was valid.

In one embodiment, the authentication server may receive, from the electronic device over the second communication channel, a password, and may persist the password.

In one embodiment, the device identifier may be a universally unique identifier.

In one embodiment, the authentication server may receive, from the application, an identification of the first communication channel for receiving the one-time passcode.

In one embodiment, the authentication server may receive from the electronic device over the second communication channel, device fingerprint data for the electronic device.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
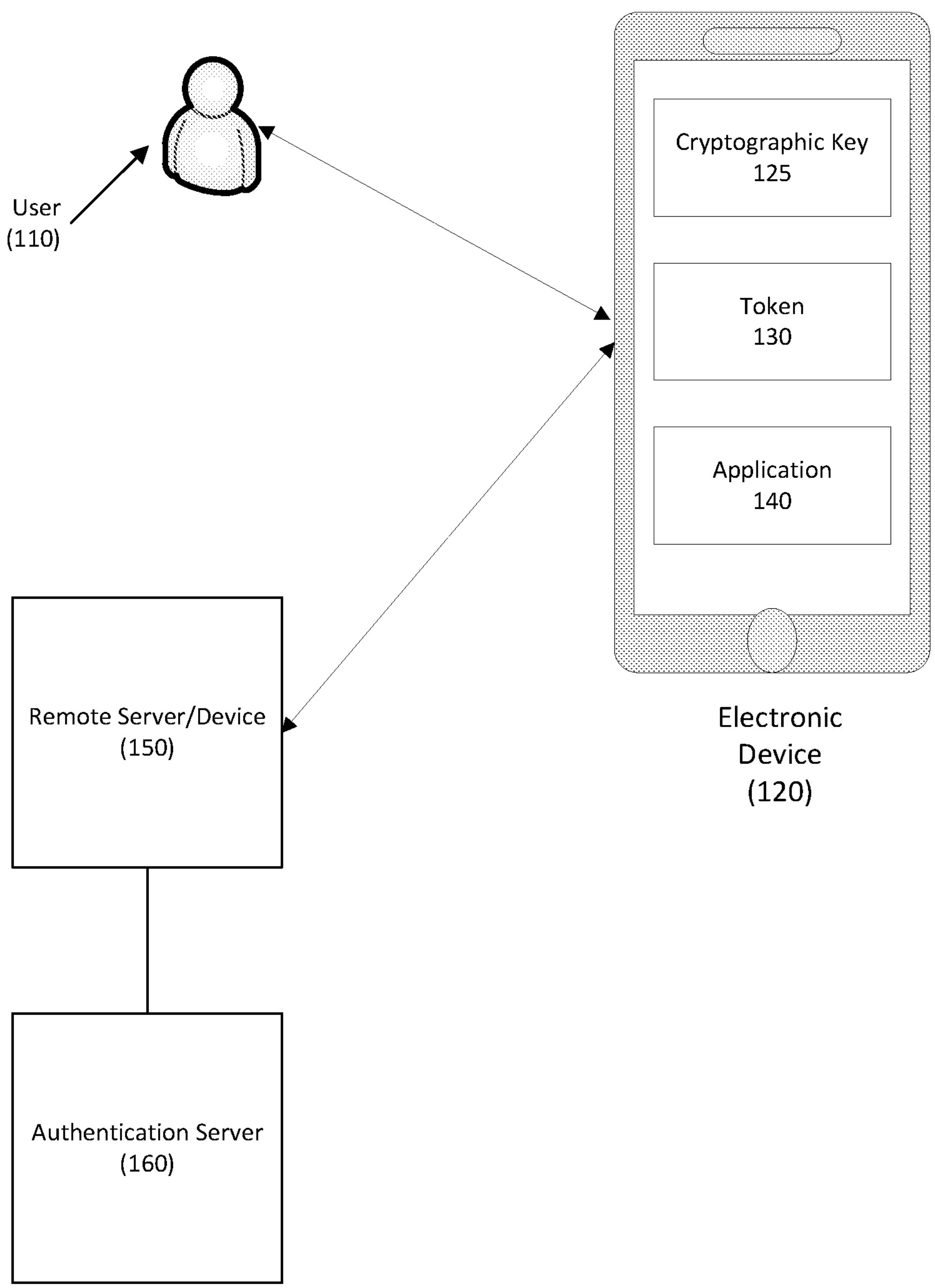
FIG. 1 depicts a system for enhanced mobile device authentication according to one embodiment.

Several embodiments of the present invention and their advantages may be understood by referring to FIGS. 1-5.

Embodiments of the present disclosure relate to enhancing the security of electronic devices, and, in particular, mobile electronic devices. Embodiments disclosed herein may provide for three levels of "trust": (1) trust that the device is secure; (2) trust that the communication channel between the device and an application executed by the device is secure; and (3) trust that the user operating the device is the individual that is associated with the device. To achieve these levels of trust, (1) the inherent security of the device may be tested, (2) the ownership of the device may be established through enrollment controls, (3) cryptographic keys and/or tokens that are a unique function of the application, the device, and the user identity may be deployed. The unique binding among the application, the device, and the user identity may be exploited to strengthen and simplify the authentication from the device. Moreover, a token encrypted with a unique cryptographic key may be used to pass to other channels and may act as a strong identifier.

In one embodiment, the token may be encrypted using a cryptographic key to act as a proxy for the customer's identity. For example, the encrypted token may support a number of different customer experiences or use cases, such as being able to use the mobile device to authenticate the customer to, for example, an ATM.

As another example, a token may be provided to the customer when the customer uses an application on the mobile device to authenticate a customer to a customer service representative. In one embodiment, customer data (e.g., account information, potential reasons for contacting the customer service representative, etc.) may be associated with the token and may be provided to the customer service representative.

The disclosure of U.S. patent application Ser. No. 13/644,326 is hereby incorporated by reference in its entirety.

In addition, a one-time Application Source Validation Key, or ASVK, may be used to verify that the application, program, or other software, is from a trusted source. For example, because mobile applications may leverage standard HTTPs internet connectivity to communicate secure requests to the server, even with mutual authentication, it cannot be definitively determined whether the application or software is authentic or otherwise sanctioned. Thus, it may be difficult to distinguish the application or software from impostor apps or scripts running on a server.

In one embodiment, a cryptographic key and/or a token may be deployed to an electronic device (e.g., a mobile electronic device, an Internet of Things appliance, a desktop computer, a workstation, etc.) during a registration process for the application, program, or software. In one embodiment, signed, sanctioned applications or software may be distributed with a protected cryptographic functionality to support application source verification. The cryptographic function, which may be protected by application-level white box cryptography, may be called to encrypt a one-time passcode (OTP) known environmental parameters and generate a one-time challenge/response. For example, in one embodiment, an ASVK encrypted cipher may be calculated as follows:

ASVK=HASH(salt+Env+OTP)

Where: (1) "Salt" may be a sequence of bits, known as a cryptographic salt and may have a static x-bit long value; "Env" may be a set of known environmental parameters or attributes, such as device fingerprint data, etc., and OTP may be a one-time ephemeral passcode delivered by the server as part of the registration process. In one embodiment, Salt, Env and OTP may be run through an ADD function, and a hashing algorithm (e.g. SHA256, SHA512, etc.) may be run over that to generate ASVK.

Other calculations for determining ASVK may be used as is necessary and/or desired.

In one embodiment, the static data may include an algorithm that may be shared by both the server and the electronic device. In one embodiment, only a sanctioned application, program, or software, properly provisioned with the protected cryptographic functionality, may create a valid ASVK. The ASVK may be used to verify that the source of mobile web service APIs is genuinely a sanctioned native application.

In another embodiment, a mobile electronic device may be used to continuously authenticate the user. At the manufacturer's device level, a variety of user data can be collected to create an association between the electronic device and its regular authorized user. As reliance on electronic devices to identify users grows, a set of controls may be used mitigate fraudulent usage.

In one embodiment, servers and virtual machines deployed within the enterprise, private and public cloud infrastructure may be used for continuous authentication.

In one embodiment, devices may leverage sensors, monitors, etc. to establish probabilistic behavior patterns. This may include, for example, biometric data, user movement data, user geolocation data, etc. In combination with machine learning, these patterns may be associated with the notion of a "regular," or registered, authorized device user.

Applications that may be deployed to the devices may associate an application level identity token with the device's "regular" authorized user. Subsequent application authentication requests will leverage this relationship to assert the application identity is the device's "regular" authorized user.

In one embodiment, the exchange of Personally Identifiable Information ("PII") may not be required. Instead, an anonymous token that correlates back to the identity may be shared between the electronic device and the authentication server.

In one embodiment, if an irregular behavior, or pattern of behaviors, are sensed, the authentication may be terminated.

Referring to FIG. 1, a system for enhanced mobile device authentication according to one embodiment is disclosed. System 100 may include user 110, electronic device 120, remote server/device 150, and authentication server 160. In one embodiment, electronic device 120 may be any suitable electronic device, including workstations, desktop computers, notebook computers, tablet computers, smart phones, Internet of Things (IOT) appliances, etc. In one embodiment, electronic device 120 may provide a secure storage area, such as in a secure element.

Electronic device 120 may execute application 140, which may be any application, computer program, or software. In one embodiment, application 130 may authenticate a user.

In one embodiment, application 140 may provide user 110 with access to sensitive, confidential, or otherwise restricted information and/or resources. In another embodiment, application 140 may provide user 110 with the ability to conduct transactions with sensitive, confidential, or otherwise restricted information and/or resources.

In one embodiment, application 140 may be provided by a financial services provider, such as a financial institution, a payment processor, an investment manager, etc.

In one embodiment, application 140 may be a mobile wallet.

In one embodiment, application 140 and/or the operating system executed by electronic device 120 may include secure storage.

In one embodiment, electronic device 120 may be provided with cryptographic key 125 and token 130. Cryptographic key 125 and/or token 130 may serve to "bind" user 110, application 130, and device 120 to each other. In one embodiment, token 130 that may be encrypted with cryptographic key 125 may be used to authenticate user 110, device 120 and/or application 140 to remote server or device 140.

Any suitable type, format, size, etc. of cryptographic key may be used as is necessary and/or desired.

In one embodiment, cryptographic key 125 may comprise an ASVK.

In one embodiment, remote server/device 150 may be an ATM.

Authentication server 160 may authenticate user 110 and/or electronic device 120. In one embodiment, authentication server 160 may be separate from remote server/device 150. In another embodiment, the functionality of authentication sever 160 may be partially or wholly incorporated into remote server/device 150.

Figure 2:
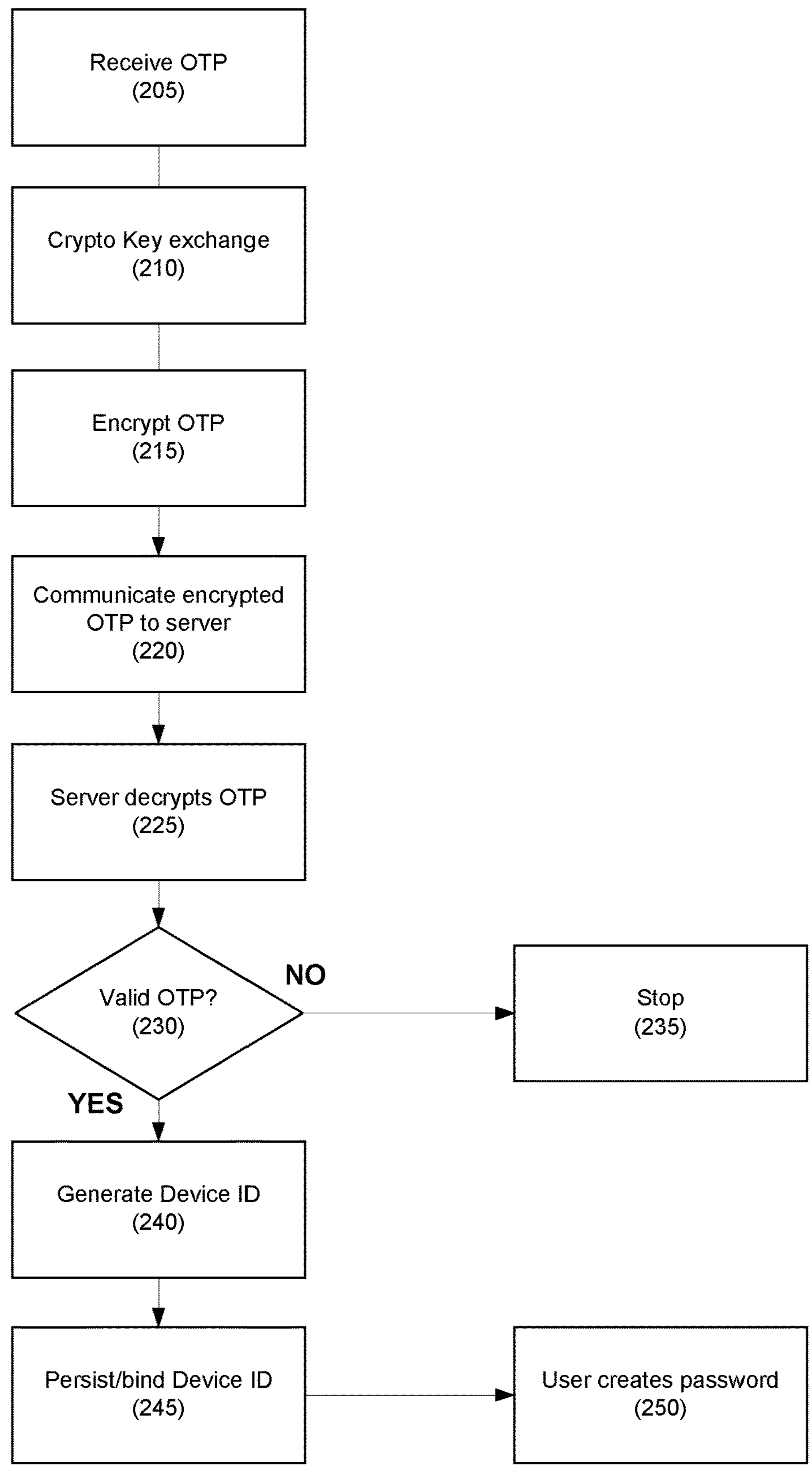
FIG. 2 depicts a method for strong registration according to one embodiment.

Referring to FIG. 2, a method for strong registration is disclosed according to one embodiment.

In step 205, a one-time passcode, or password, may be received by, for example, an application executed by an electronic device. In one embodiment, the one-time passcode may be provided by the server, and may be considered to be a "challenge" in a challenge/response authentication protocol.

In one embodiment, the one-time passcode may be received on an out-of-band network (e.g., SMS, email, etc.).

In step 210, a crypto key exchange may be performed. In one embodiment, the application may generate public and private keys, and may exchange public keys with the authentication server.

In one embodiment, the private key may be persisted in the secure element of the electronic device or in a secure storage element of the application or operating system. In one embodiment, the manner of storage may depend on whether the user may be authenticated to the electronic device using, for example, biometrics. For example, if the electronic device can receive biometrics, and the user is authenticated, the private key may be stored in the electronic device's secure element. If the electronic device is not biometric-enabled, the private key may be stored in the secure storage element of the application or operating system.

In step 215, the one-time passcode may be digitally signed or encrypted using, for example, the private key. The encrypted one-time passcode may be considered to be a "response" in the challenge/response authentication protocol.

In step 220, the encrypted one-time passcode may be communicated to the authentication server. In one embodiment, additional data, such as device fingerprint data, malware data, username, and password, etc. may also be communicated as is necessary and/or desired.

In one embodiment, device fingerprint data may include, for example, operating system data (e.g., operating system version number, etc.), browser data (e.g., browser, version, etc.), locale data (e.g., country, language, etc.), hardware/system data (e.g., operating system, screen resolution, screen aspect ratio, manufacturer, serial number, SIM card, jailbreak information, etc.), settings data, cookie data, mobile application data, etc. It may further collect data from a mobile wallet application, such as user id and password. Other device data may be used as is necessary and/or desired.

In step 225, an authentication server may decrypt the one-time passcode, and, in step 230, the authentication server may determine whether or not the one-time passcode is valid. If it is not, the process may be stopped in step 235. In one embodiment, error messages, warnings, etc. may be provided as is necessary and/or desired.

In step 240, a device identifier may be generated by the authentication server. In one embodiment, the device identifier may be a variant of universally unique identifier (UUID) that may be created based on, for example, the RFC 4122 UUID namespace specification. In one embodiment, the device identifier may be persisted at the authentication server.

In step 245, the device identifier and the electronic device may be may be persisted at, for example, the authentication server. Other information may be persisted as is necessary and/or desired.

In one embodiment, the device identifier may be communicated to the electronic device and persisted at the electronic device.

In step 250, the user may enter a password, and the password may be received and persisted at the authentication server. The user may also provide contact information which may also be persisted in storage at the authentication authority.

Figure 3:
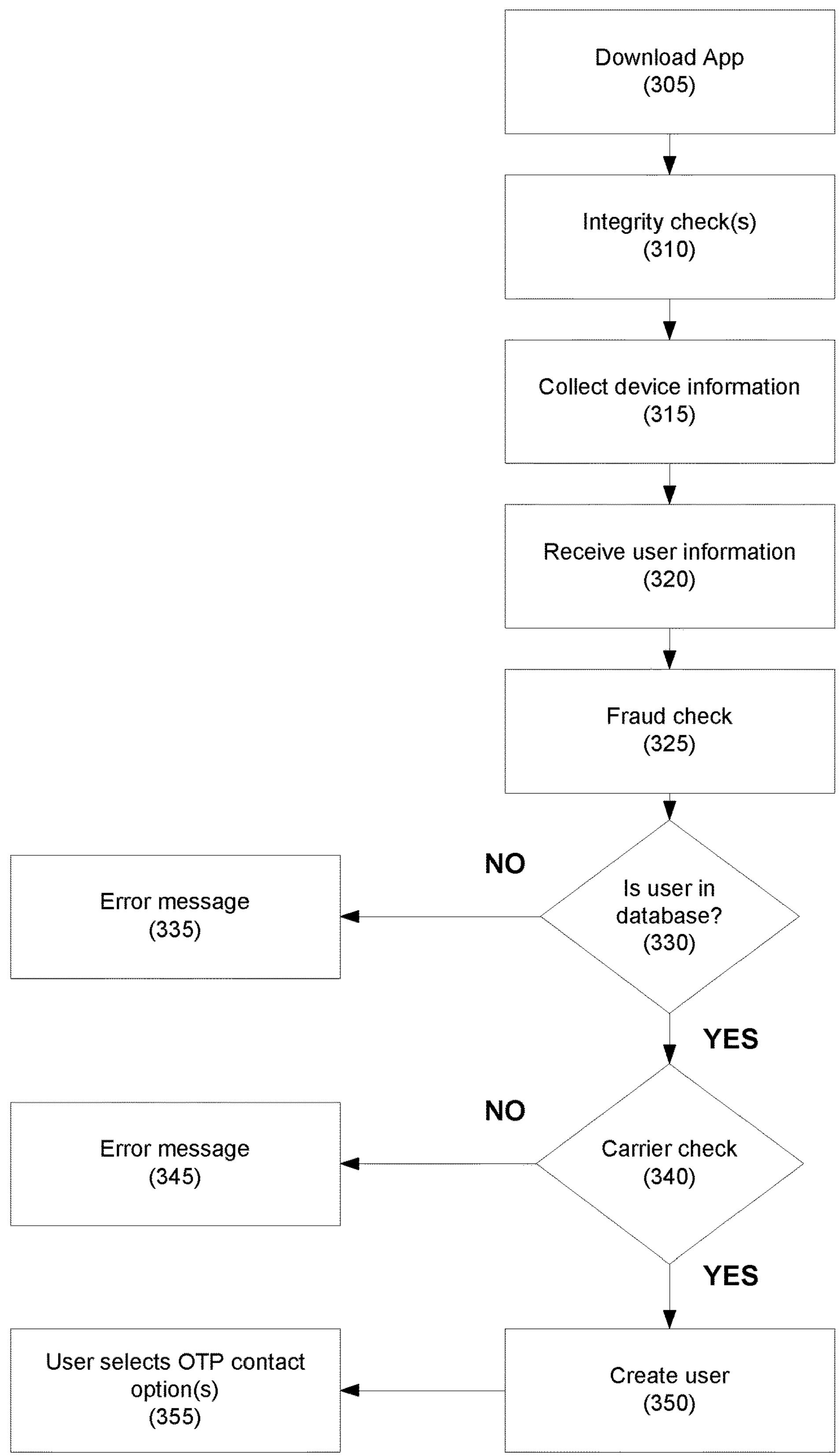
FIG. 3 depicts an enrollment process using enhanced mobile device authentication according to one embodiment.

Referring to FIG. 3, an enrollment process is disclosed according to one embodiment.

In step 305, a user may download a software application or program onto his or her electronic device. In one embodiment, the software application may be downloaded from an app store or similar location.

In step 310, the application may perform an integrity check on the electronic device. In one embodiment, the application may check to see if there is malware on the electronic device, if the electronic device has been "rooted," whether the application is an authorized application, etc. In one embodiment, this may include updating malware detection software.

In one embodiment, any checks that may verify the integrity of the electronic device and/or the operating system executed thereby may be performed as is necessary and/or desired.

In step 315, device profiling data may be collected. In one embodiment, this data may be used to determine whether the electronic device has previously been involved with, or associated with, fraud. In one embodiment, the application may provide electronic device data (e.g., serial number, MAC address, etc.) to an authenticating entity, which may compare the electronic device data to that in a blacklist, a white list, etc.

In step 320, the user may be prompted for user information, such as a user name, account number, date of birth, etc., and may enter such information.

In step 325, the entered data and device profiling data may be provided to the authenticating entity, which may perform a device profiling check for fraud.

In step 330, the authenticating entity may identify the user in its database(s). If the user is not found, a message may be displayed in step 335. In one embodiment, the process may be stopped.

If the user is found, in step 340, an optional carrier check may be performed. For example, if the electronic device is operating on a carrier network, a carrier check may be performed in conjunction with a third party mobile network operator (i.e., a carrier) to corroborate that the user data on record both within, for example, a financial institution as well as the carrier, matches. An unsuccessful carrier check may indicate fraud, and in step 345, a message indicating such may be displayed. In one embodiment, the process may be stopped.

If the carrier check is verified, in step 350, a user may be created, and, in step 355, the user may select one or more one-time passcode contacts (e.g., email, SMS, etc.).

Figure 4:
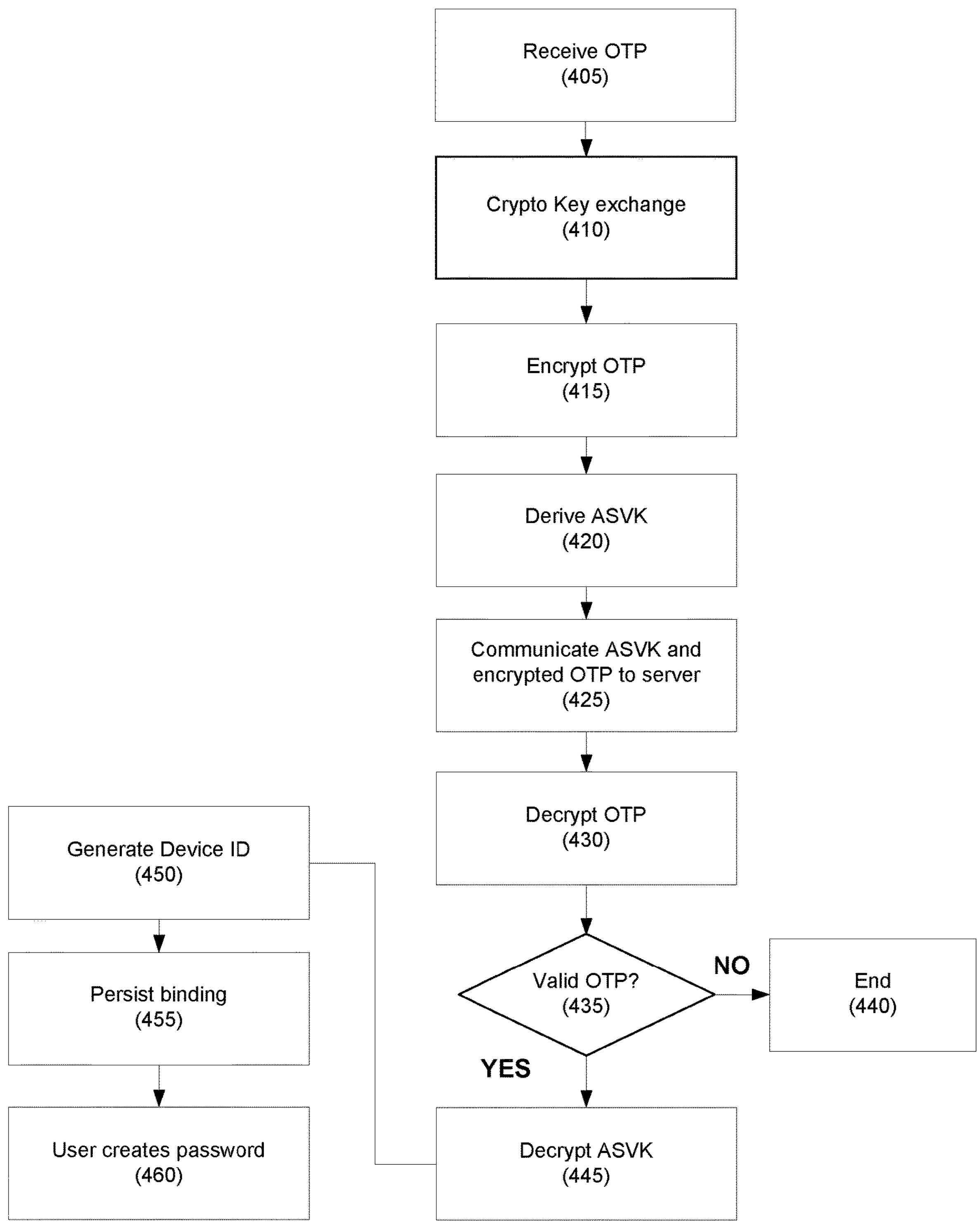
FIG. 4 depicts a method for strong registration using enhanced mobile device authentication according to embodiments.

Referring to FIG. 4, a method for strong registration is disclosed according to one embodiment. In one embodiment, cryptographic key exchange using crypto-authentication protocols may be used among the electronic device, the application executed by the device, and the authentication server.

In step 405, an electronic device may receive a one-time passcode. In one embodiment, the one-time passcode may be received, for example, via an out-of-band communication channel (e.g., SMS, email, etc.). In one embodiment, the out-of-band communication channel may be the one that the user selected during registration.

In step 410, a crypto key exchange may be performed. This may be similar to step 210, above.

In step 415, the one-time passcode may be encrypted using, for example, the private key. This may be similar to step 215, above.

In step 420, the application specific verification key may be derived. In one embodiment, the AVSK may be derived using the algorithm, above. Other suitable algorithms may be used as is necessary and/or desired.

In step 425, the ASVK and the encrypted one-time passcode may be communicated to the authentication server. In one embodiment, additional data, such as device fingerprint data, malware data, username, and password, etc. may also be communicated as is necessary and/or desired. In one embodiment, some or all of the additional data may be encrypted.

In step 430, the authentication server may decrypt the one-time passcode and, in step 435, may determine if the one-time passcode is valid. If it is not, in step 440, the process may end.

If the one-time passcode is valid, in step 445, the AVSK may be decrypted, and in step 450, a device identifier may be generated. This may be similar to step 240, above.

In step 455, the device identifier may be persisted in storage, for example, at the authentication authority. In addition, a Boolean value (e.g., true or false) indicating whether the application source verification process succeeded or failed may also be persisted at the authentication server. Other information may be persisted as is necessary and/or desired.

In one embodiment, the device identifier may be communicated to the electronic device and persisted at the electronic device.

In step 460, the user may then create a password, and may provide contact information. This may be similar to step 250, above.

Figure 5:
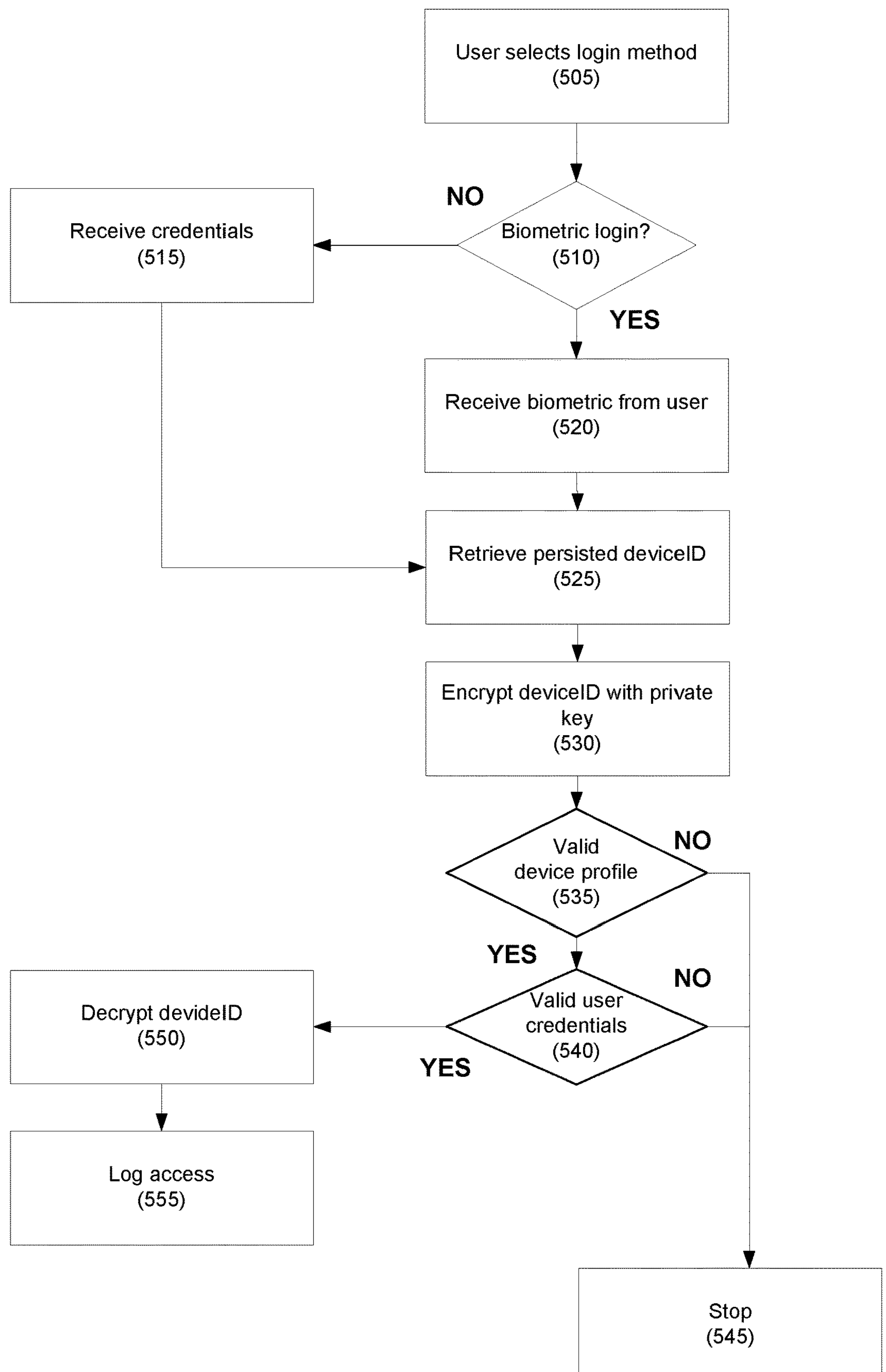
FIG. 5 depicts a method for strong registration using enhanced mobile device authentication according to another embodiment.

Referring to FIG. 5, a method for strong authentication is disclosed according to another embodiment.

In step 505, a user may select a login method, such as userid/password, biometric, etc. If, in step 510, the user does not select a biometric login, the application may receive the user's credentials. If the user selects biometric login, in step 520, the application may receive biometrics from the user.

In step 525, the deviceID may be retrieved from, for example, the device's secure element and, in step 530, the deviceID may be encrypted with, for example, a private key from the device's secure element, or from a secure storage element of the application or operating system.

In one embodiment, as part of this process, a one-time passcode may be received, and an ASVK may be generated and communicated to the authentication server.

In step 535, the electronic device's profile may be verified. If it cannot be verified, in step 555, the process may stop. In one embodiment, this may include checking to see if the electronic device is a familiar electronic device (e.g., a returning electronic device) based on fingerprint data, cookies, etc. In one embodiment a check may be made to determine if the electronic device acting suspiciously (e.g., associated with many accounts, resetting passwords on multiple accounts), known to have been associate with fraud, etc.

In step 540, the user's credentials (e.g., username/password, authentication token, biometrics, etc.) may be checked for validity. If the user's credentials cannot be verified, in step 545, the process may stop.

In step 545, the authentication server may decrypt the deviceID, and, in step 550, access may be granted and logged.

The following disclosures are hereby incorporated, by reference, in their entities: U.S. Patent Application Ser. Nos. 61/820,917; 61/823,669; Ser. No. 13/908,618; 61/844,097; Ser. No. 13/940,799; 61/860,475; and Ser. No. 13/972,556.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable OSI protocols such as TCP/IP, UDP, IP, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

The invention claimed is:

1. A system for electronic device authentication, comprising:

an electronic device comprising at least one electronic device computer processor, a memory, and an interface an executing a computer application;

an authentication server comprising at least one server computer processor;

a first communication channel between the electronic device and the server; and a second communication channel between the electronic device and the server;

where:

the authentication server is configured to generate a one-time passcode and is configured to communicate the one-time passcode to the over the first communication channel;

the computer application is configured to generate an application specific verification key (ASVK), wherein the computer application specific verification key is calculated according to the following equation:

ASVK=HASH(salt+Env+OTP);

where:

"salt" comprises a cryptographic salt;

"Env" comprises at least one environmental parameter;

OTP is the one-time password; and

HASH comprises a hashing algorithm;

the computer application is configured to encrypt the one-time passcode with a private key and is configured to communicate, over the second communication channel, the one-time passcode encrypted with the private key and the application specific verification key to the authentication server to the authentication server;

the authentication server is configured to decrypt the encrypted one-time passcode using a public key;

the authentication server is configured to validate the one-time passcode;

the authentication server is configured to generate a device identifier for the electronic device;

the authentication server is configured bind the device identifier and the electronic device;

the authentication server is configured to communicate, over the second communication channel, the device identifier for the electronic device to the computer application; and the computer application is configured to store the device identifier.

2. The system of claim 1, wherein the authentication server is configured to decrypt the application specific verification key and is configured to store an indication that the application specific verification key was valid.

3. The system of claim 1, wherein the authentication server is configured to receive, from the electronic device over the second communication channel, a password, and save the password.

4. The system of claim 1, wherein the device identifier comprises a universally unique identifier.

5. The system of claim 1, wherein the authentication server is configured to receive, from the computer application, an identification of the first communication channel for receiving the one-time passcode.

6. The system of claim 1, wherein the authentication server is configured to receive from the electronic device over the second communication channel, device fingerprint data for the electronic device.

7. A method for electronic device authentication, comprising:

generating, by an authentication server comprising at least one computer processor, a one-time passcode and communicating the one-time passcode over a first communication channel to a computer application executed by an electronic device;

receiving, by authentication server and from the computer application over a second communication channel, the one-time passcode encrypted with a private key and an application specific verification key (ASVK), wherein the computer application specific verification key is calculated according to the following equation:

ASVK=HASH(salt+Env+OTP);

where:

"salt" comprises a cryptographic salt;

"Env" comprises at least one environmental parameter;

OTP is the one-time password; and

HASH comprises a hashing algorithm;

decrypting, by the authentication server, the encrypted one-time passcode using a public key;

validating, by the authentication server, the one-time passcode;

generating, by the authentication server, a device identifier for the electronic device;

binding, by the authentication server, the device identifier and the electronic device;

communicating, by the authentication server and over the second communication channel, the device identifier for the electronic device to the computer application, wherein the computer application stores the device identifier.

8. The method of claim 7, further comprising:

receiving, by the server from the computer application and over the second communication channel, a password; and storing, by the server, the password.

9. The method of claim 7, wherein the device identifier comprises a universally unique identifier.

10. The method of claim 7, further comprising:

receiving, by the server, from the computer application and over the second communication channel, a public key paired with the private key.

11. The method of claim 7, further comprising:

receiving, by the server, from the computer application and over the second communication channel, device fingerprint data for the electronic device.

12. The method of claim 7, further comprising:

communicating, by the server and over the second communication channel, the device identifier to the electronic device.

* * * * *